(12) United States Patent
Manning et al.

(10) Patent No.: US 12,200,495 B2
(45) Date of Patent: Jan. 14, 2025

(54) INTEGRATING SECURITY AND ROUTING POLICIES IN WIRELESS TELECOMMUNICATION NETWORKS

(71) Applicant: T-Mobile USA, Inc., Bellevue, WA (US)

(72) Inventors: Serge Manning, Plano, TX (US); Gregory Schumacher, Burlington, MA (US); Marouane Balmakhtar, Alexandria, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 237 days.

(21) Appl. No.: 17/989,886

(22) Filed: Nov. 18, 2022

(65) Prior Publication Data

US 2024/0171980 A1    May 23, 2024

(51) Int. Cl.
*H04W 12/37*    (2021.01)

(52) U.S. Cl.
CPC .................................. *H04W 12/37* (2021.01)

(58) Field of Classification Search
None
See application file for complete search history.

(56) References Cited

U.S. PATENT DOCUMENTS

| | | |
|---|---|---|
| 5,968,176 A | 10/1999 | Nessett et al. |
| 6,714,987 B1 | 3/2004 | Amin et al. |
| 6,839,338 B1 | 1/2005 | Amara et al. |
| 6,954,790 B2 | 10/2005 | Forsloew |
| 7,032,241 B1 | 4/2006 | Venkatachary et al. |
| 7,136,645 B2 | 11/2006 | Hanson et al. |
| 7,308,703 B2 | 12/2007 | Wright et al. |
| 7,317,699 B2 | 1/2008 | Godfrey et al. |
| 7,342,906 B1 | 3/2008 | Calhoun |
| 7,478,427 B2 | 1/2009 | Mukherjee et al. |
| 7,522,906 B2 | 4/2009 | Whelan et al. |
| 7,526,800 B2 | 4/2009 | Wright et al. |
| 7,787,863 B2 | 8/2010 | Van |
| 7,804,808 B2 | 9/2010 | Bhagwat et al. |

(Continued)

FOREIGN PATENT DOCUMENTS

| | | |
|---|---|---|
| DE | 102016004256 A1 | 10/2016 |
| EP | 1098490 A2 | 5/2001 |

(Continued)

*Primary Examiner* — Trang T Doan
(74) *Attorney, Agent, or Firm* — Perkins Coie LLP

(57) ABSTRACT

A system includes a policy control function (PCF) that receives an indication from a mobile device in a wireless cellular network that indicates a secure connection between the mobile device and an endpoint in the wireless cellular network. The secure connection is associated with a security policy that includes a first set of parameters and operates at a first level of granularity and a routing policy that includes a second set of parameters and operates at a second level of granularity. The PCF then determines a mapping between the first set of parameters and the second set of parameters that aligns the first level of granularity with the second level of granularity. In an example, the alignment improves the utilization of network resources in the wireless cellular network. The mapping is then transmitted to the mobile device, which enables the mobile device to use the secure connection.

20 Claims, 6 Drawing Sheets

(56) References Cited

U.S. PATENT DOCUMENTS

| | | |
|---|---|---|
| 7,933,221 B1 | 4/2011 | Pawar et al. |
| 8,155,020 B2 | 4/2012 | Giaretta et al. |
| 8,156,544 B2 | 4/2012 | Fuccello |
| 8,201,234 B2 | 6/2012 | Diaz-cuellar et al. |
| 8,305,996 B2 | 11/2012 | Rahman et al. |
| 8,345,604 B2 | 1/2013 | Balasubramanian et al. |
| 8,363,626 B2 | 1/2013 | Faccin |
| 8,386,766 B2 | 2/2013 | Nylander et al. |
| 8,391,834 B2 | 3/2013 | Raleigh |
| 8,411,691 B2 | 4/2013 | Aggarwal |
| 8,428,067 B2 | 4/2013 | Budampati et al. |
| 8,467,312 B2 | 6/2013 | Raleigh |
| 8,677,114 B2 | 3/2014 | Lewis et al. |
| 8,965,367 B1 | 2/2015 | Bartlett et al. |
| 9,131,425 B2 | 9/2015 | Giaretta et al. |
| 9,173,144 B2 | 10/2015 | Singh et al. |
| 9,497,740 B2 | 11/2016 | Gupta |
| 9,584,366 B2 | 2/2017 | Godfrey et al. |
| 9,647,988 B2 | 5/2017 | May |
| 9,661,544 B2 | 5/2017 | Jamadagni et al. |
| 9,762,478 B2 | 9/2017 | Giaretta et al. |
| 9,800,552 B2 | 10/2017 | Garg et al. |
| 9,826,398 B2 | 11/2017 | Chen |
| 9,860,779 B2 | 1/2018 | Mccann et al. |
| 9,894,556 B2 | 2/2018 | Tomici et al. |
| 9,924,401 B2 | 3/2018 | Gupta |
| 9,954,902 B1 | 4/2018 | Sethi |
| 10,405,373 B2 | 9/2019 | Chai et al. |
| 10,524,225 B1 * | 12/2019 | Boross ................ G01S 5/0295 |
| 10,783,581 B2 * | 9/2020 | Raleigh ............ H04M 15/8083 |
| 12,069,029 B2 * | 8/2024 | Shribman ............. H04L 63/029 |
| 2002/0161905 A1 | 10/2002 | Haverinen et al. |
| 2006/0059538 A1 | 3/2006 | Lee |
| 2006/0153153 A1 | 7/2006 | Bhagwat et al. |
| 2007/0115899 A1 | 5/2007 | Ovadia et al. |
| 2007/0143824 A1 | 6/2007 | Shahbazi |
| 2007/0186281 A1 | 8/2007 | Mcalister |
| 2007/0189194 A1 | 8/2007 | Hrastar |
| 2007/0268516 A1 | 11/2007 | Bugwadia et al. |
| 2008/0148350 A1 | 6/2008 | Hawkins et al. |
| 2008/0273520 A1 | 11/2008 | Kim et al. |
| 2009/0031395 A1 | 1/2009 | Lee |
| 2010/0064133 A1 | 3/2010 | Martin et al. |
| 2010/0208659 A1 * | 8/2010 | Liebhart ............... H04W 8/082 |
| | | 370/328 |
| 2011/0002466 A1 | 1/2011 | Kwak et al. |
| 2012/0023236 A1 | 1/2012 | Backholm et al. |
| 2016/0057108 A1 * | 2/2016 | Hu ...................... H04L 63/0485 |
| | | 726/15 |
| 2017/0026231 A1 | 1/2017 | Poosala et al. |
| 2019/0116493 A1 * | 4/2019 | Cyril ..................... H04W 12/06 |
| 2021/0328993 A1 * | 10/2021 | Komu ................ H04L 63/0263 |
| 2021/0385736 A1 | 12/2021 | Zaks |
| 2022/0201638 A1 * | 6/2022 | Arrobo Vidal ........ H04W 48/08 |
| 2024/0114035 A1 * | 4/2024 | Rungta ................... H04L 63/20 |
| 2024/0118954 A1 * | 4/2024 | Boccuzzi ................. G06F 9/547 |
| 2024/0121314 A1 * | 4/2024 | Boccuzzi ................ H04L 41/12 |

FOREIGN PATENT DOCUMENTS

| | | |
|---|---|---|
| EP | 2761935 B1 | 2/2017 |
| JP | 5820533 B2 | 10/2015 |
| KR | 100704677 B1 | 4/2007 |
| KR | 101504389 B1 | 3/2015 |
| WO | 9854644 A1 | 12/1998 |
| WO | 02089395 A1 | 11/2002 |
| WO | 03090041 A2 | 10/2003 |
| WO | 2006120533 A2 | 11/2006 |
| WO | 2008042318 A2 | 4/2008 |
| WO | 2009051528 A1 | 4/2009 |
| WO | 2013049060 A1 | 4/2013 |
| WO | 2013161233 A1 | 10/2013 |
| WO | 2013174267 A1 | 11/2013 |
| WO | 2013184225 A1 | 12/2013 |
| WO | 2014065943 A1 | 5/2014 |
| WO | 2014130094 A1 | 8/2014 |
| WO | 2016172252 A1 | 10/2016 |
| WO | 2019027776 A1 | 2/2019 |
| WO | 2020153894 A1 | 7/2020 |

* cited by examiner

INTEGRATING SECURITY AND ROUTING POLICIES IN WIRELESS TELECOMMUNICATION NETWORKS

BACKGROUND

User equipment (UE) operating in cellular networks leverage security and routing policies in order to interact with other nodes in the network (e.g., a 3GPP-compliant gNodeB in a Fifth Generation (5G) network). In an example, the routing policy uses a UE Route Selection Policy (URSP), and the security policy uses an Internet Protocol Security (IPsec) protocol.

The URSP, which is typically configured by the Policy Control Function (PCF), includes information mapping certain user data traffic (i.e., applications) to 5G PDU Session connectivity parameters. The user data traffic is defined in the URSP rule by a "traffic descriptor" parameter that can include e.g., IP filter parameters or Application Identity. The URSP is used by the UE to determine if an application started in the UE can be using an already established PDU Session or there is a need to trigger the establishment of a new PDU Session. The URSP also indicates to the UE whether the application traffic can be offloaded to non-3GPP access outside a PDU Session.

IPsec is a secure network protocol suite that authenticates and encrypts packets of data to provide secure encrypted communication between two computers over an IP network. IPsec includes protocols for establishing mutual authentication between agents at the beginning of a session and negotiation of cryptographic keys to use during the session. IPsec can protect data flows between a pair of hosts (e.g., host-to-host), between a pair of security gateways (e.g., network-to-network), or between a security gateway and a host (e.g., network-to-host). IPsec uses cryptographic security services to protect communications over Internet Protocol (IP) networks.

BRIEF DESCRIPTION OF THE DRAWINGS

Detailed descriptions of implementations of the present technology will be described and explained through the use of the accompanying drawings.

Figure 1:
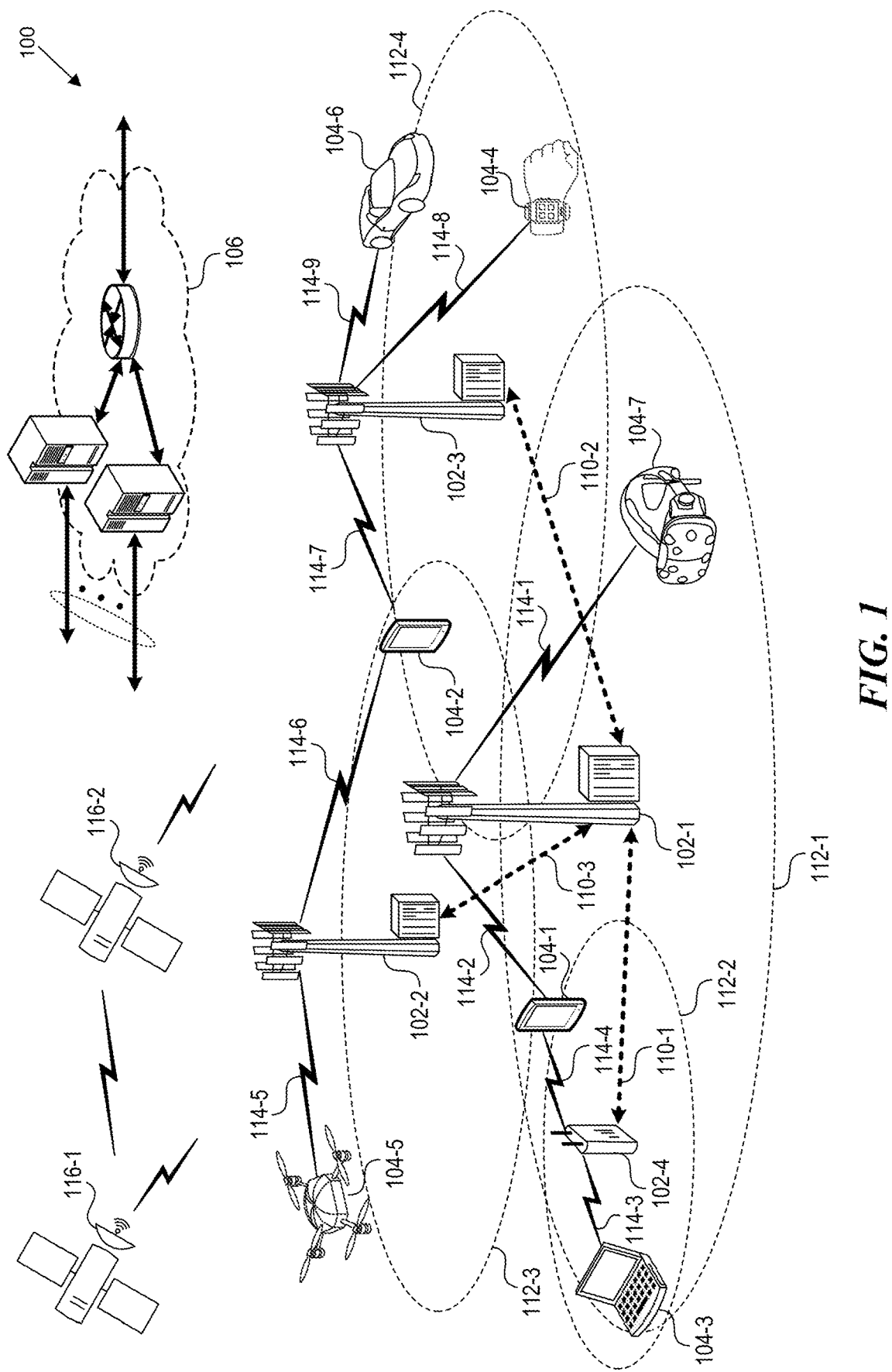
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Fifth Generation (5G) networks are providing connectivity between mobile broadband, fixed wireless access, and the cellular Internet-of-Things. The routing that enables this connectivity must be optimized to ensure network resources (e.g., bandwidth, power of mobile devices, etc.) are not wasted, and the data traveling through the network must be secured to ensure subscriber privacy. However, in existing implementations (e.g., the Open Systems Interconnection (OSI) model), routing policies and security policies are implemented at different layers of the system, and a misalignment between parameters in these policies can result in degraded network performance.

In an example, the 5G IPsec Security Association (SA) may specify that certain points in the network (e.g., mobile devices or base stations) must be connected using secure tunnels that provide a certain level of security, but the 5G bearer policy, which includes the URSP, may configure routes that do not include the secure tunnels, thereby compromising the privacy of the data being transmitted between those points in the network. In another example, the URSP parameters may specify a maximum number of secure tunnels between two points in the network, but the IPsec parameters may establish a number of secure tunnels that exceeds this maximum number, resulting the wasted network resources.

Embodiments of the disclosed technology relate to integrating the security policies implemented for connections in a wireless cellular network with the routing policies therein. For example, the 5G IPsec SA is integrated with the URSP. By aligning the security and routing policies, which operate at the different OSI layers, the use of network resources can be protected and maximized, and also enables 5G network established IPsec SAs to be seamlessly integrated with customer IPsec SAs.

In particular, a method for utilizing a secure connection in a wireless telecommunication network includes receiving, from a mobile device utilizing the wireless telecommunication network, an indication of the secure connection between the mobile device and an endpoint of the wireless telecommunication network. The secure connection is associated with a security policy and a routing policy, and the method further includes determining that a first set of parameters of the security policy is misaligned with a second set of parameters of the routing policy. In this example, the first set of parameters being misaligned with the second set of parameters includes at least one of: (a) the first set of parameters specifying an Internet Protocol (IP) address range and the second set of parameters specifying that an IP address of the endpoint is outside the specified IP address range, (b) the first set of parameters specifying a first type of security policy for the secure connection and the second set of parameters specifying that the endpoint uses a second type of security policy different from the first type of security policy, or (c) the first set of parameters specifying a reuse of an existing secure connection and the second set of parameters specifying an establishment of a new secure connection. Based on determining that the misalignment exists, the method modifies (a) at least one of the first set of parameters to align parameters of the security policy with parameters of the routing policy or (b) at least one of the second set of parameters to align the parameters of the routing policy with the parameters of the security policy, and then transmits the modified at least one of the first set of parameters or the modified at least one of the second set of parameters to the mobile device so that it can use the secure connection.

In another example, a computer-implemented method for utilizing a secure connection in a wireless telecommunication network includes receiving, from a mobile device utilizing the wireless telecommunication network, an indication of the secure connection between the mobile device and an endpoint of the wireless telecommunication network. The secure connection is associated with a security policy, which includes a first set of parameters and operates at a first level of granularity, and a routing policy, which includes a second set of parameters and operates at a second level of granularity that is different from the first level of granularity. The computer-implemented method then determines a mapping between the first set of parameters and the second set of parameters that aligns the first level of granularity with the second level of granularity, and transmits the mapping to the mobile device to enable it to utilize the secure connection.

In yet another example, a wireless device is in communication with a policy control function (PCF) of a wireless telecommunication network. The PCF receives, from the wireless device utilizing the wireless telecommunication network, an indication of the secure connection between the wireless device and an endpoint of the wireless telecommunication network. Herein, the secure connection is (a) associated with a security policy that includes a first set of parameters and a routing policy that includes a second set of parameters, and (b) is characterized by multiple characteristics. The PCF identifies a first parameter of the first set of parameters and a second parameter of the second set of parameters that correspond to at least one characteristic of the multiple characteristics, and configures at least one characteristic subsequent to modifying (a) the first parameter to align with the second parameter or (b) the second parameter to align with the first parameter. After configuring at least one characteristic, the PCF transmits the modified first parameter or the modified second parameter to the wireless device, which is configured to utilize the secure connection with the configured at least one characteristic.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In an example, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

The network 100 can implement 6G, which is the sixth-generation standard and successor to 5G. Examples of 6G technologies include broadband cellular networks, increased densification, and/or increased diversification. In another example of 6G, the network 100 enables terrestrial and non-terrestrial transmissions, where a non-terrestrial network (NTN) is enabled by satellites 116-1 and 116-2 to deliver communications services anywhere, and can also provide coverage in areas that are unreachable by a conventional terrestrial network (TN). In yet another example of 6G, the network 100 can implement terahertz (THz) communications. This will support wireless applications that demand ultrahigh quality of service requirements and multi-terabits per second data transmission, such as terabit-per-second backhaul systems, ultrahigh-definition content streaming among mobile devices, ARNR technology (e.g., creating a virtual presence in the metaverse), and wireless high-bandwidth secure communications.

Secure Connections Based on Integrating Security and Routing Policies

To provide authentication, confidentiality, and integrity protection, 5G can use IPsec or Transport Layer Security (TLS), with the former working at a lower layer on the network. An IPsec Security Association (SA) can be established by mobile device (or User Equipment) applications needing heightened security or for a Virtual Private Network (VPN) that uses IPsec. The 5G network also uses IPsec for bulk interface security protections and VPN services (e.g., Wi-Fi access). In some implementations, the network operator may also provide IPsec services for specific users, but in these cases, the SA establishment is typically through proprietary means.

5G has enabled a network operator to provide routing policies for both upstream and downstream IP traffic, with the upstream flow selectors operating under the UE Route Selection Policy (URSP). The URSP is typically downloaded and controlled by the network. IPsec also has an IP packet selector and routing functions to route packets to the appropriate SA. However, the IPsec policy configuration is typically proprietary and separate from network control. The interplay between the routing and security policies is further evidenced in the context of the 5G architecture, shown in FIG. 2, and described below.

Figure 2:
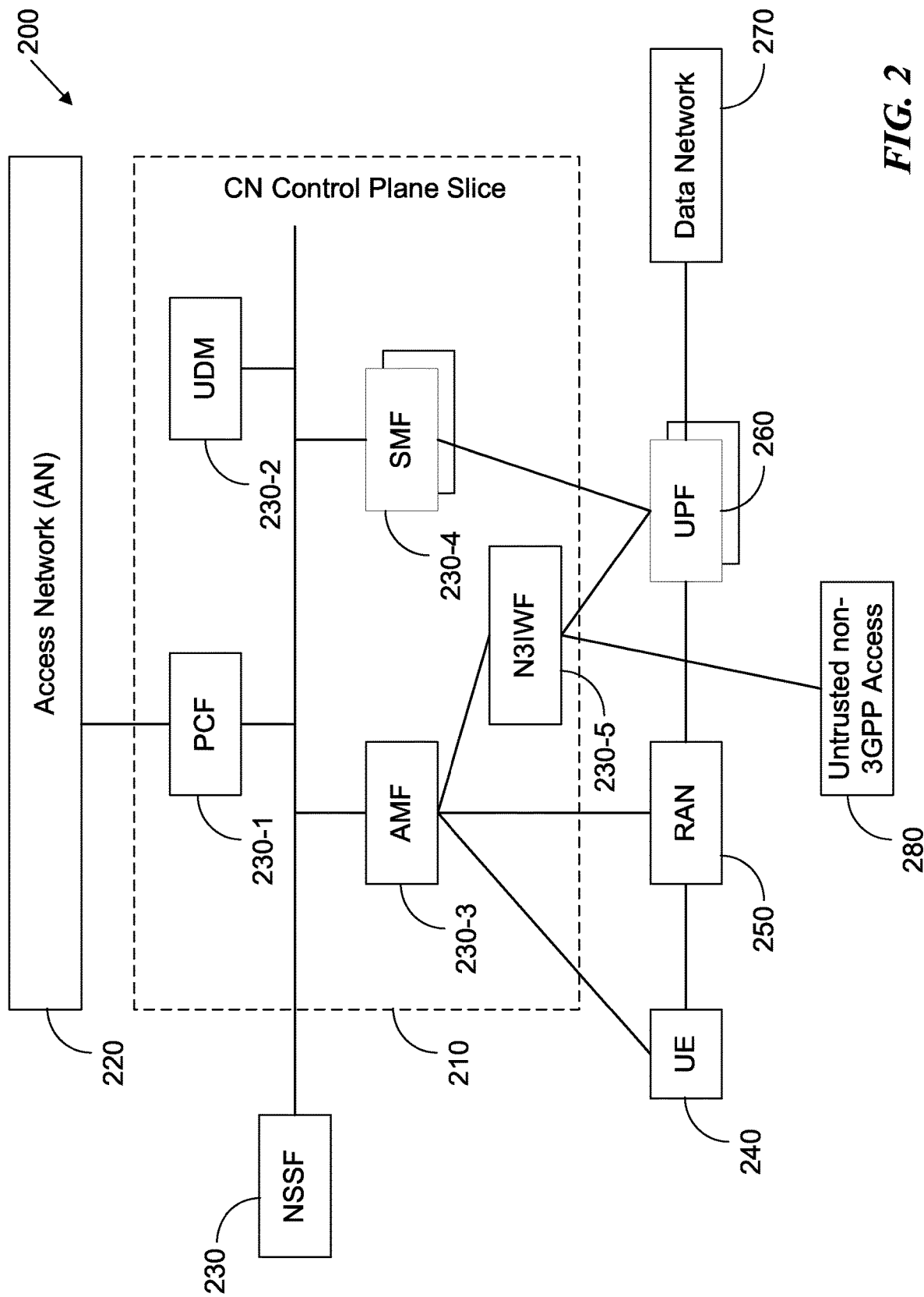
FIG. 2 is a block diagram that illustrates an example of a system for utilizing a secure connection in wireless telecommunication network, in accordance with implementations of the present technology.

FIG. 2 is a block diagram that illustrates some components of the 5G network core architecture 200 that can be used to implement a secure connection in wireless telecommunication network, in accordance with the present technology. As shown therein, a Core Network (CN) Control Plane Slice 210 interfaces with an Access Network (AN) 220 and operates in conjunction with a Network Slice Selection Function (NSSF) 230, which enables the CN Control Plane Slice 210 to communicate with User Equipment (UE) 240, Radio Access Network (RAN) 250, User Plane Function (UPF) 260, Data Network 270, and untrusted non-3GPP access points 280.

As shown in FIG. 2, the CN Control Plane Slice 210 includes a Policy Control Function (PCF) 230-1, a Unified Data Management (UDM) 230-2, an Access and Mobility management Function (AMF) 230-3, a Session Management Function (SMF) 230-4, and an internetworking function called the Non-3GPP Inter Working Function (N3IWF) 230-5. The UPF 260 is part of the user plane and the PCF 230-1, UDM 230-2, AMF 230-3, SMF 230-4, and N3IWF 230-5 are part of the control plane. In typical 5G architectures, the UPF 260 is deployed separately from control plane functions. The CN Control Plane Slice 210 also includes other modules and functions that are not expressly illustrated in FIG. 2.

The NSSF 230 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers. The UE 240 is associated with one or more network slices, which all use the same AMF 230-3. A Single Network Slice Selection Assistance Information (S-NSSAI) function operates to identify a network slice. Slice selection is triggered by the AMF, which receives a wireless device registration request. In response, the AMF 230-3 retrieves permitted network slices from the UDM 230-2 and then requests an appropriate network slice of the NSSF 230.

The UPF 260 is the anchor point for inter/intra Radio Access Technology (RAT), i.e., the underlying physical connection method in the telecommunication network, mobility. It supports packet routing and forwarding, quality-of-service (QoS) handling for the user plane, packet inspection, and policy rule enforcement.

The PCF 230-1 supports a unified policy framework within the 5G infrastructure for governing network behavior. The PCF 230-1 accesses the subscription information required to make policy decisions from the UDM 230-2, and then provides the appropriate policy rules to the control plane functions so that they can enforce them. The Service Communication Proxy (SCP, and not shown in FIG. 2) provides a highly distributed multi-access edge compute cloud environment and a single point of entry for a cluster of network functions, once they have been successfully discovered by the NF Repository Function (NRF, and not shown in FIG. 2). This allows the SCP to become the delegated discovery point in a datacenter, offloading the NRF from distributed service meshes that make-up a network operator's infrastructure. Together with the NRF, the SCP forms the hierarchical 5G service mesh.

The UDM 230-2 introduces a User Data Convergence (UDC) that separates a User Data Repository (UDR) for storing and managing subscriber information. As such, the UDM 230-2 can employ the UDC under 3GPP TS 22.101 to support a layered architecture that separates user data from application logic. The UDM 230-2 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 230-2 can contain voluminous amounts of data that is accessed for authentication. Thus, the UDM 230-2 is analogous to a Home Subscriber Server (HSS), to provide authentication credentials while being employed by the AMF 230-3 and SMF 230-4 to retrieve subscriber data and context.

The AMF 230-3 supports mobility management, access authentication and authorization, security anchor functions, and context management. The AMF 230-3 is configured to determine that the SMF 230-4 is best suited to handle the connection request by querying the NRF.

The SMF 230-4 supports session management, selection and control of user plane functions, downlink data notification, and roaming.

The N3IWF 230-5 supports connecting to untrusted non-3GPP access systems (e.g., Wi-Fi), and in that capacity, supports the establishment of IPsec tunnels with the UE 240 and relays the information needed to authenticate the UE and authorize its access to the 5G Core Network.

As shown in FIG. 2, the 5G architecture includes N3IWF 230-5, which is used to establish secure tunnels, and UPF 260, which implements packet forwarding and routing. Secure tunnels may be established using IPsec (e.g., standardized in RFC 4301), which deploys multiple databases that contain the security parameters and policies for IPsec tunnels. These databases include the Security Policy Database (SPD), the Security Associations Database (SAD), and the Peer Authentication Database (PAD), and store rules and policies for classifying which packets traverse each secure tunnel and define how packets going into and out of the tunnels are processed. These IPsec databases overlap with URSP functionality (responsible for packet forwarding and routing), and thus there is a need to coordinate security and routing policies to ensure the granularity chosen by the traffic selector for IPsec tunnels matches the granularity in the corresponding URSP rule.

Implementations of the disclosed technology mitigate the misalignment of tunnel parameters and packet processing between UE implementations and what the network expects based on the URSP rules provisioned by the network for the UE. In an example, this is achieved by integrating and unifying some information related to IPsec operation into URSP. The described implementations also enable the 5G network to configure and control IPsec policy functions remotely.

The disclosed implementations provide, inter alia, the following capabilities to eliminate the misalignment between URSP and IPsec:
  provide a mapping URSP rules to one or more IPsec security contexts to avoid different granularities between URSP traffic descriptors and IPsec traffic selectors. For example, a 3GPP service flow and/or QoS flow can be mapped to an IPsec SA;
  indicate when to reuse an existing IPsec tunnel versus initiating a new IPsec tunnel. For example, if a user has established an end-to-end IPsec SA, a network outer tunnel may not be needed, so the network rule could specify that a network SA be established only if no inner SA is operating;

manage UE and network resources. For example, the maximum number of IPsec tunnels used for a URSP rule may be limited or constrained;

convey IPsec parameter values directly to the UE via a URSP rule; and establish a correlation between the downstream IPsec SA policy rules and the downstream bearer selection.

In some implementations, a URSP rule (e.g., as defined in 3GPP TS 24.526) contains a traffic descriptor that includes one or more of the following:

match-all traffic indicator;
one or more application identifiers;
one or more IP 3-tuples, e.g.,
  destination IP address,
  destination port number, and
  protocol used in the above connection;
one or more non-IP descriptors, e.g., destination info for non-IP traffic;
one or more Data Network Names (DNNs);
one or more connection capabilities; and
one or more domain descriptors, e.g., destination Fully Qualified Domain Name (FQDN) or a regular expression as a domain name matching criteria.

An IPsec tunnel can have up to N traffic selectors for IPv4 and IPv6 that include one or more of the following:

local IP address, e.g., network prefix, address range, specific host, wildcard;
remote IP address, e.g., network prefix, address range, specific host, wildcard;
protocol used in the connection, e.g., Transmission Control Protocol (TCP), User Datagram Protocol (UDP), or Stream Control Transmission Protocol (SCTP);
local port related to the above protocol;
remote port related to the above protocol;
Internet Control Message Protocol (ICMP) message type and code; and
mobility header type.

In some implementations, the parameters of the IPsec traffic selectors may be specified as a range or using specific values. In an example, the above traffic selector attributes can be manipulated to create a single IPsec encrypted tunnel to carry all traffic between two security gateways. In another example, the traffic selector attributes can be manipulated to create separate IPsec encrypted tunnels for each TCP connection between each pair of hosts communicating across the gateways.

URSP rules can provide more varied control for IP traffic when compared to IPsec. In an example, including a DNN, which identifies a Data Network (e.g., Data Network 270 in FIG. 2), in the URSP rule implies a set of IP address pools that are used in the Data Network, and consequently, limits the remote IP address ranges in the IPsec traffic selector. In another example, including a destination FQDN in the URSP rule implicitly limits the remote IP address range to that domain in the IPsec traffic selector. In yet another example, any connection capabilities included in the URSP rule imply a similar restriction on the Data Network and the remote IP addresses or address ranges used in the IPsec traffic selector. In yet another example, an application identifier being included in the URSP rule implicitly limits the local IP address and local port ranges to that application in the IPsec traffic selector.

Implementations of the described technology ensure that IPsec tunnels provide security protection (either integrity, confidentiality, or both) to all of the traffic as instructed by the URSP rule. This may result in IPsec tunnels providing protection to more traffic than what is demanded by the URSP rule, but ensures that the IPsec tunnels do not provide protection to less traffic.

If an IPsec tunnel is already established between the UE and a destination endpoint in a Data Network, and a URSP rule requires a secure tunnel, existing IPsec tunnel can be used based on the operator policy. For example, if all the traffic of the URSP rule is covered by an existing IPsec tunnel, the policy may allow tunnel reuse. Otherwise, a new IPsec tunnel may be established for the traffic pertaining to the URSP rule depending on tunnel termination points (e.g., network vs end-to-end).

The network can manage IPsec resource use triggered by the UE based on URSP rules. In an example, the following constraints may be embedded into URSP rules that are used by the network in the configuration of the IPsec policy:

a limit on the number of simultaneous SAs that can be established;
a limit on the type of security protection of the tunnels (e.g., confidentiality, integrity, or both); and/or
a limit on the security algorithm negotiation.

Some IPsec parameters (e.g., related to the network configuration and not normally known to a UE) can be provided by the network as part of the URSP rules to enable the UE to establish IPsec security tunnels that are compatible with the URSP rules. In an example, these additional IPsec parameters include:

specific fields in the IPsec traffic selector. For example, per RFC 7296 (that defines the Internet Key Exchange Protocol Version 2 (IKEv2) standard), the specific fields may include a local IP address, a remote IP address, a protocol ID/name, a source port, a destination port, and/or a metric. Furthermore, multiple sets of these parameters may be defined as part of the same IPsec traffic selector;
supported security algorithms (IKE) and certificate management; and/or
permissible overlapping or splitting of SAs with bearers, e.g., some SAs may operate over multiple bearers, or some SAs with the same set of characteristics may be limited to specific bearers.

In the latter scenario, at the URSP level, multiple traffic selectors may be configured such that each traffic selector leads to a separate negotiation that results in the operation of multiple SAs, with each SA having its own set (or multiple sets) of IP prefixes, ports, and protocols. An example of this scenario is when a UE needs to establish multiple IPsec tunnels to different destination networks.

For example, a UE may be configured to use a service which generates two distinct IP flows, A and B, to the same destination application server. As part of service requirements, flow A requires integrity protection while flow B is more sensitive and requires confidentiality protection. The transport needs are similar for both, so the same network slice could carry both flows destined to the same Data Network using a single URSP rule. However, due to the security requirements (i.e., A requiring integrity protection and B requiring confidentiality protection), the network constructs two URSP rules and sends them to the UE in order to provide different parameters for two different IPsec SAs. The network sets two different traffic descriptors for flow A and flow B using, for example, two different source ports, but the same application ID or the same domain FQDN (e.g., service.acme.com). The network sets the same routing selection descriptor, e.g., the same slice S-NSSAI and same DNN for both. However, each rule has a different IPsec SA, one providing integrity protection while the other provides confidentiality protection. The network sets IPsec parameters to the UE to use for each SA such as different remote addresses or port ranges as well as identifiers for different security credentials (e.g., different certificates). Thus, in this example, the UE processes two different IP flows over two IPsec connections in order to meet the security requirements.

In the example processes described below, the wireless telecommunication network is a 5G network, and the security policy corresponds to an IPsec security context, and the routing policy corresponds to a URSP.

Figure 3A:
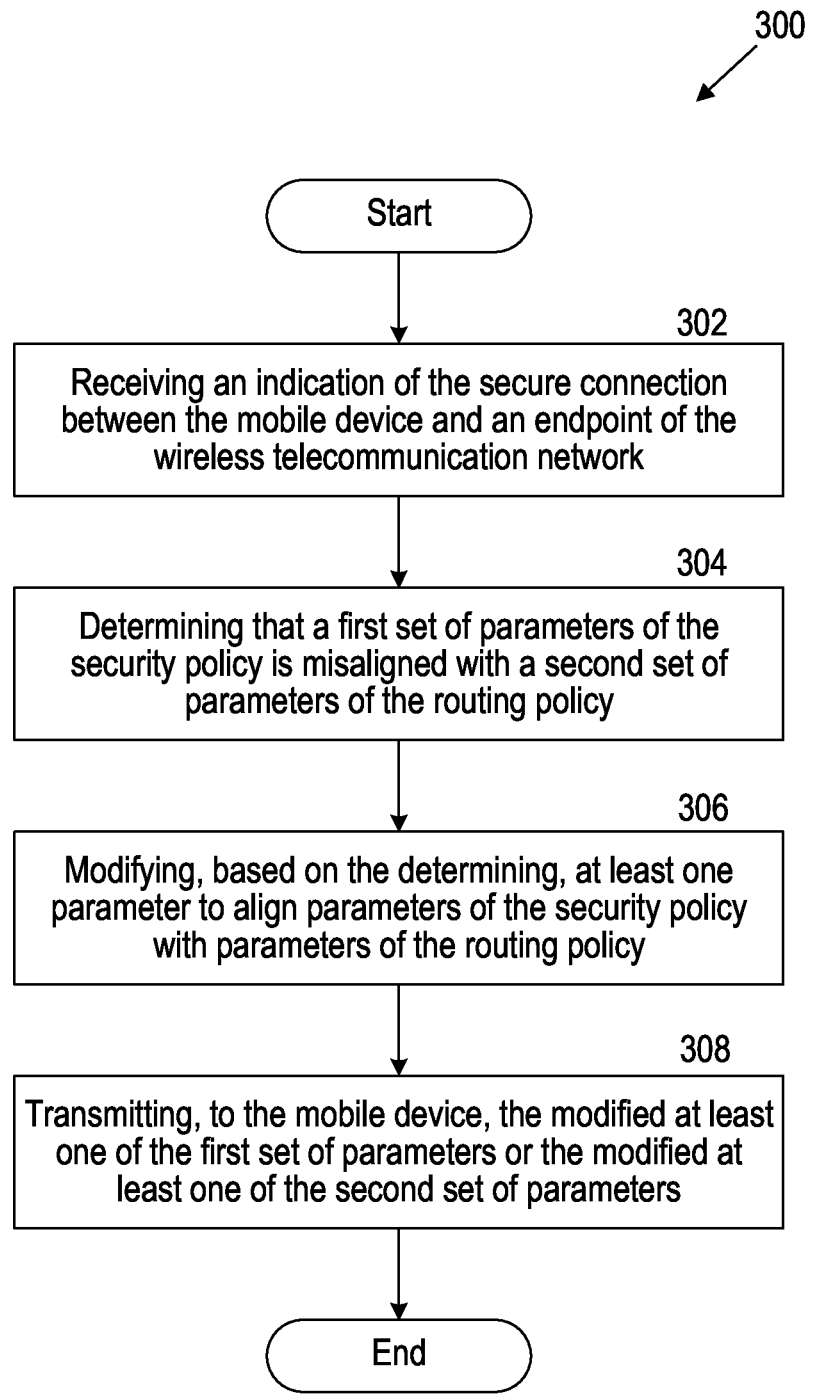
FIGS. 3A-3C are flowcharts that illustrates example processes for utilizing a secure connection in wireless telecommunication network, in accordance with implementations of the present technology.

FIG. 3A is a flowchart that illustrates an example process 300 for utilizing a secure connection in wireless telecommunication network. For example, a PCF includes a computing system 400 described with respect to FIG. 4. When the instructions are executed by at least one hardware processor, the PCF performs the process 300.

At act 302, the process includes receiving, from a mobile device utilizing the wireless telecommunication network, an indication of the secure connection between the mobile device and an endpoint of the wireless telecommunication network.

In an example, the indication is transmitted as part of a UE capability indicator via the Access and Mobility management Function (e.g., AMF 230-3 in FIG. 2). If the secure connection is being set up, this indication may be transmitted as part of one or more Internet Key Exchange (IKE) messages or in the session establishment message.

In another example, instead of relying on a secure connection indication from the UE, the network receives security and connectivity parameters (e.g., what level of security is needed, the application server address pools) from out-of-band application providers. The network combines this information with its own bearer policy (e.g., what kind of traffic is carried by each slice, what Data Networks are connected to each slice, etc.), and then aligns its own bearer policies to support the needs of the out-of-band application providers in the most efficient way and generates a set of aligned URSP rules that include IPsec parameters. The network is configured to download the set of rules to the UE when it initially connects to the system, and the UE has aligned URSP rules if it decides to invoke any services.

An example of aligning with out-of-band application providers may include the UE supporting two different services, C and D, together at the same time, but service C requiring a lower level of security (a simpler encryption algorithm) than service D. In this case, the network may decide ahead of time to save resources and use one IPsec connection for both services, and therefore sets both services to use one IPsec SA with the security requirements of the more demanding application. The single IPsec SA secure tunnel terminates within the destination Data Network at a security gateway before continuing to the two application servers. In this scenario, two URSP rules, one for each service, have the same routing policy and the same IPsec parameters, and the UE uses the common IPsec SA for both services.

In an example described in FIG. 3A, the secure connection is associated with a security policy, which has a first set of parameters, and a routing policy, which has a second set of parameters.

At act 304, the process includes determining that a first set of parameters of the security policy is misaligned with a second set of parameters of the routing policy. In an example, the first set of parameters may be the parameters of the IPsec traffic selector for IPv4 or IPv6 as enumerated above. In another example, the second set of parameters may be the parameters of the URSP traffic descriptor as enumerated above.

In some implementations, the first set of parameters being misaligned with the second set of parameters includes at least one of: (a) the first set of parameters specifying an Internet Protocol (IP) address range and the second set of parameters specifying that an IP address of the endpoint is outside the specified IP address range, (b) the first set of parameters specifying a first type of security policy for the secure connection and the second set of parameters specifying that the endpoint uses a second type of security policy different from the first type of security policy, (c) the first set of parameters specifying a reuse of an existing secure connection and the second set of parameters specifying an establishment of a new secure connection, or (d) the first set of parameters specifying a first slice type based on security requirements and the second set of parameters specifying a second slice type that is different from the first slice type.

In an example, the first set of parameters may specify the particular slice type(s) requested by the UE when connecting to the network. If the UE requests, e.g., one general slice type, S-NSSAI=eMBB for multiple applications with similar security requirements, the network can try to reuse secure connections as much as possible since the application flow characteristics might be similar. On the other hand, if the UE requests, e.g., two very different slice types, S-NSSAI=eMBB and S-NSSAI=URLLC, the UE probably needs to use multiple secure connections since the treatment of packets might be very different between the applications, even though both services have similar security requirements.

At act 306, the process includes modifying, based on the determining, (a) at least one of the first set of parameters to align parameters of the security policy with parameters of the routing policy or (b) at least one of the second set of parameters to align the parameters of the routing policy with the parameters of the security policy. In some embodiments, determining whether to modify the parameters of the routing policy or the security policy in order to align both policies may be based on meeting the needs of the application and/or the constraints of the network policy. In an example, a first network may be configured to minimize the total number of secure connections, whereas in another example, a second network may be configured to prioritize the isolation of services from each other (e.g., if the services are sensitive or expensive in nature).

At act 308, the process includes transmitting, to the mobile device, the modified at least one of the first set of parameters or the modified at least one of the second set of parameters. In an example, the first set of parameters and/or second set of parameters may include UE secure connection indications, UE slice type requests, UE subscription information, network bearer policy, application provider requirements both for connectivity and security for each service, and the like. In another example, the first set of parameters can include one or more of a local IP address, a remote IP address, a transport protocol identifier of a transport protocol for the secure connection, a local port corresponding to the local IP address and the transport protocol, a remote port corresponding to the remote IP address and the transport protocol, an Internet Control Message Protocol (ICMP) message type or code, or a mobility header type, and/or the second set of parameters can include one or more of an application identifier, an IP 3-tuple comprising an IP address, a port, and a transport protocol, a non-IP descriptor, a Data Network Name (DNN), a connection capability, or a domain descriptor.

In the context of process 300, the indication can be received by a Policy Control Function (PCF, e.g., PCF 230-1 in FIG. 2) that is communicatively coupled to the mobile device. The PCF determines the optimal alignment of parameters for the network by generating the URSP rules that include the routing parameters as well as IPsec security parameters, and is further configured to download the modified (and aligned) parameters to the UE. In an example, this download may be via a UE Configuration Update, which can be initiated by the network (or PCF) at any time the UE is available.

In some embodiments, the first set of parameters associated with the security policy can be configured by the application developer of an application used by a user of the mobile device. Alternatively, or additionally, the first set of parameters may be provided to the network by the application provider (e.g., ahead of time as part of the initial contract or setup). Furthermore, the first set of parameters may also be affected by the UE's subscription, which can include services the user has purchased from the network operator.

Each of a number of secure connections being used by the mobile device can be associated with the first set of parameters, and the process 300 further includes determining that the number of secure connections is less than a maximum number of secure connections specified in the second set of parameters by comparing the number of secure connections to the maximum number. In an example, the UPF (e.g., UPF 260 in FIG. 2) can configure the maximum number of secure connections.

The security policy can operate at a first level of granularity of a communication resource, and the routing policy can operate at a second level of granularity that is different from the first level of granularity. In an example, the first level and second level of granularities refers to the granularity of a communication resource, e.g., an exact address/port value or range of address/port values, single DNN or multiple DNNs, domains or subdomains of one or more FQDNs, and/or a characteristic of a Quality-of-Service (QoS) flow. In another example, the granularity of the communication resource can also include the priority level, the packet delay budget, the packet error rate, the jitter, the maximum packet loss rate, and other parameters that can be indexed and modified by, for example, the 5G Quality Indicator (5QI).

Figure 3B:
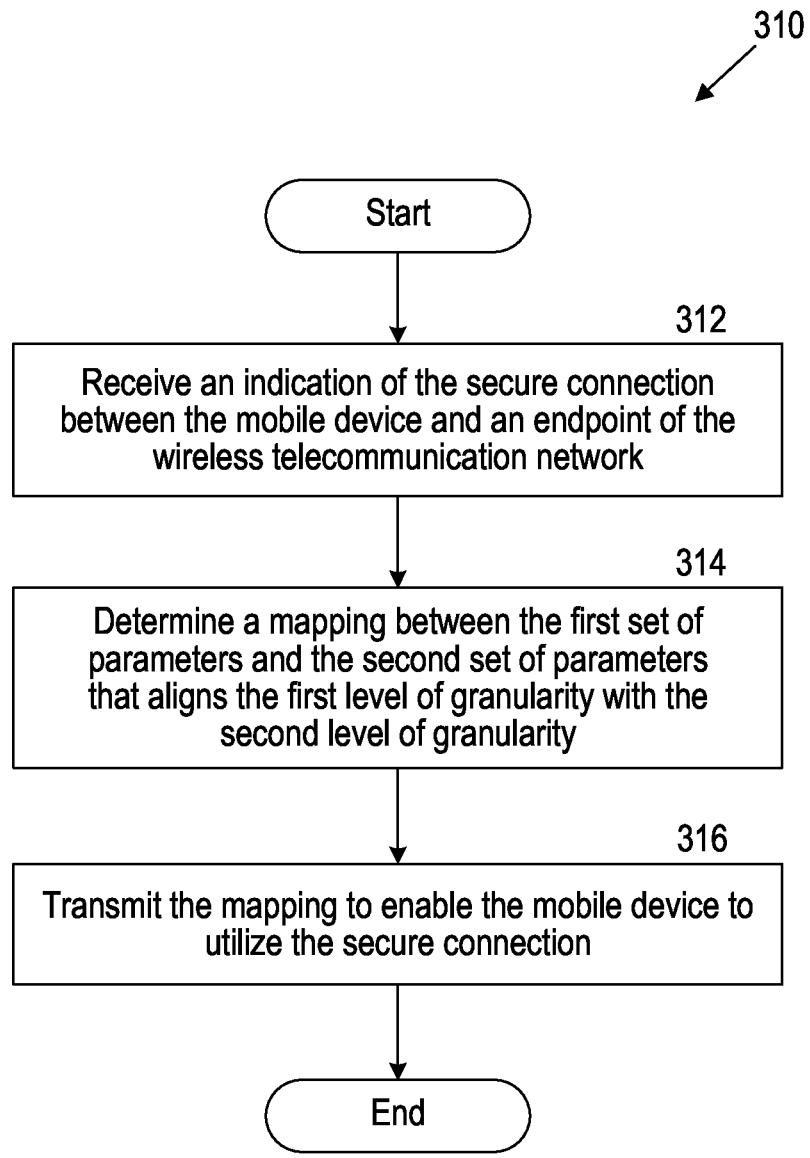

FIG. 3B is a flowchart that illustrates another example process 310 for utilizing a secure connection in wireless telecommunication network. For example, the PCF includes a computing system 400 described with respect to FIG. 4. When the instructions are executed by at least one hardware processor, the PCF performs the process 310.

At act 312, the process includes receiving, from a mobile device utilizing the wireless telecommunication network, an indication of the secure connection between the mobile device and an endpoint of the wireless telecommunication network. Herein, the secure connection is associated with a security policy and a routing policy. The security policy comprises a first set of parameters and operates at a first level of granularity, and the routing policy comprises a second set of parameters and operates at a second level of granularity that is different from the first level of granularity.

At act 314, the process includes determining a mapping between the first set of parameters and the second set of parameters that aligns the first level of granularity with the second level of granularity.

The mapping can include an indication of whether to reuse an existing secure tunnel or initiate a new secure tunnel.

The mapping can include a correspondence between a fully qualified domain name (FQDN) of the endpoint and a range of Internet Protocol (IP) addresses that can be used by the mobile device.

The mapping can include a correspondence between one or more of the first set of parameters and a service flow or a QoS flow.

At act 316, the process includes transmitting the mapping to the mobile device to enable it to utilize the secure connection. In some implementations, the mapping is transmitted via a UE Configuration Update, and can be initiated by the network at any time the UE is available. In the described embodiments, the URSP rules that are transmitted (as part of the mapping) are extended to include the preferred IPsec connection parameters provided by the network to the UE.

In an example, the first set of parameters are stored in one or more of a Security Policy Database (SPD), a Security Associations Database (SAD), or a Peer Authentication Database (PAD). In another example, a value of at least one of the second set of parameters is equal to a value of a corresponding parameter in the first set of parameters that is stored in the SPD, the SAD, or the PAD.

Figure 3C:
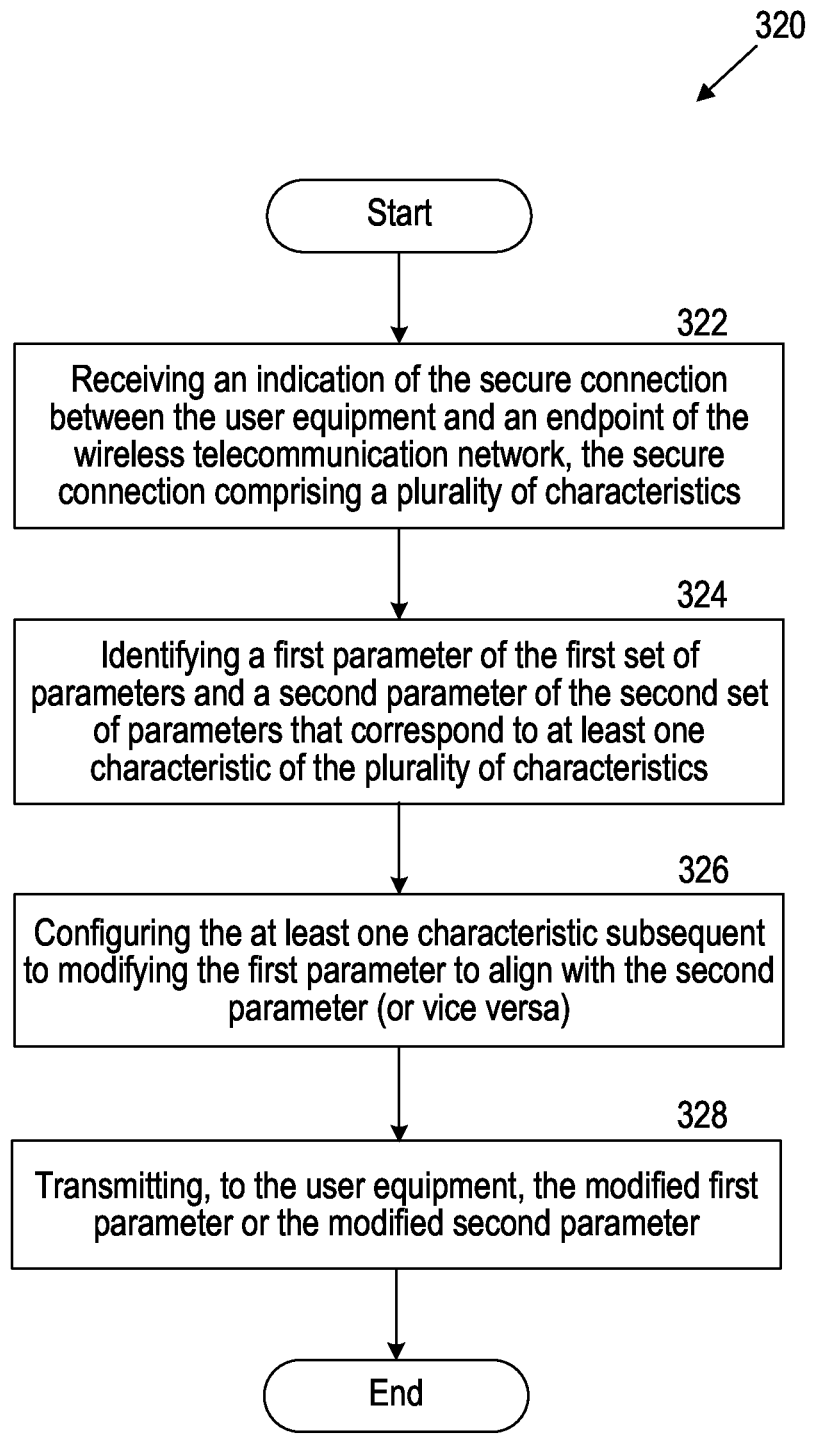

FIG. 3C is a flowchart that illustrates yet another example process 320 for utilizing a secure connection in wireless telecommunication network. For example, the PCF includes a computing system 400 described with respect to FIG. 4. When the instructions are executed by at least one hardware processor, the PCF performs the process 320.

At act 322, the process includes receiving, from a user equipment utilizing the wireless telecommunication network, an indication of the secure connection between the user equipment and an endpoint of the wireless telecommunication network. In this example, the secure connection is associated with a security policy comprising a first set of parameters and a routing policy comprising a second set of parameters, and the secure connection comprises a plurality of characteristics.

At act 324, the process includes identifying a first parameter of the first set of parameters and a second parameter of the second set of parameters that correspond to at least one characteristic of the plurality of characteristics.

At act 326, the process includes configuring at least one characteristic subsequent to modifying (a) the first parameter to align with the second parameter or (b) the second parameter to align with the first parameter.

At act 328, the process includes transmitting, to the user equipment, the modified first parameter or the modified second parameter. In this example, the user equipment, upon reception of the modified first parameter or the modified second parameter, is configured to utilize the secure connection with the configured at least one characteristic.

In some implementations, at least one characteristic comprises an exact source or destination address or range of addresses, one or more connection capabilities, a destination domain in the form of an FQDN, a quality-of-service (QoS) metric, or a number of secure tunnels supported by the secure connection. In other implementations, at least one characteristic may include QoS profiles and associated QoS Flow IDs (QFIs), PDU Session IDs, Uplink (UL) GPRS Tunneling Protocol (GTP)-U Tunnel Information, or non-access stratum (NAS) PDU Session Establishment signaling.

Computer System

Figure 4:
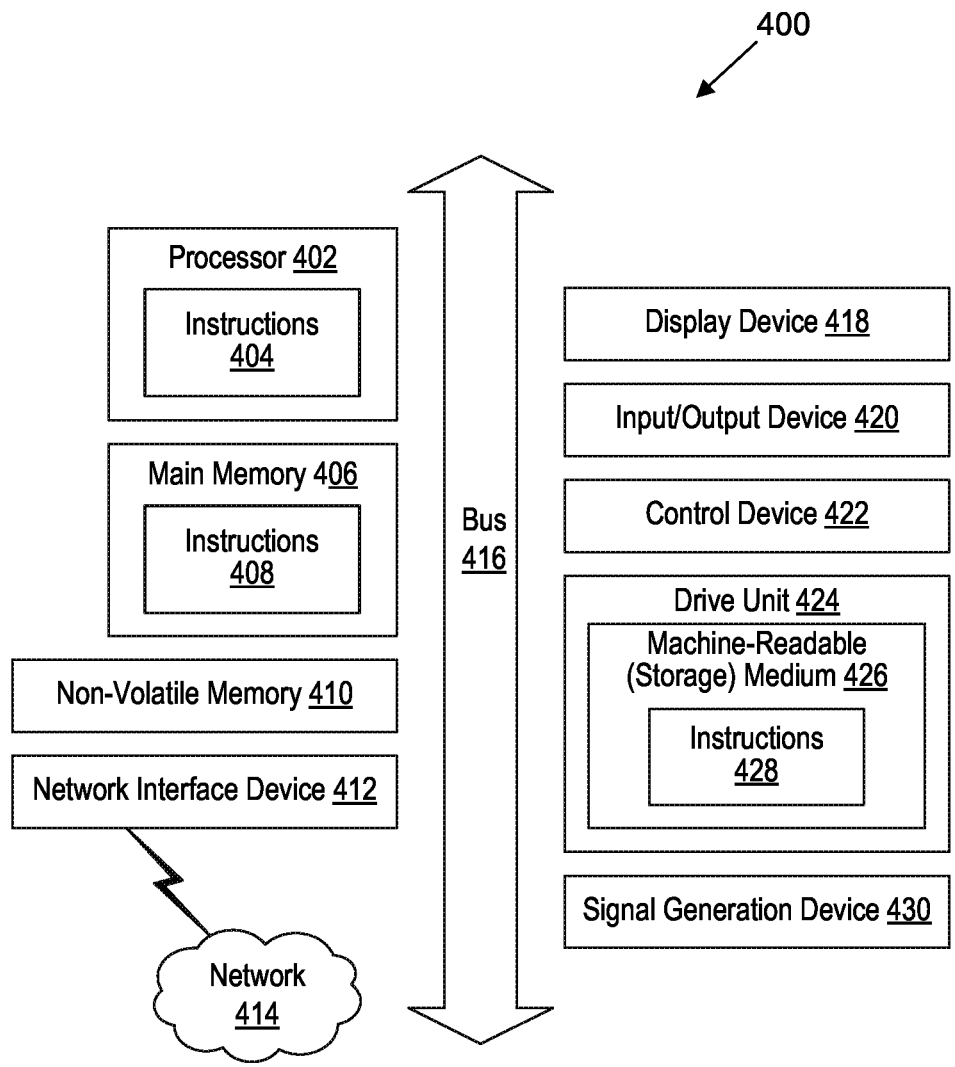
FIG. 4 is a block diagram that illustrates an example of a computer system in which at least some operations described herein can be implemented.

FIG. 4 is a block diagram that illustrates an example of a computing system 400 in which at least some operations described herein can be implemented. As shown, the computing system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computing system 400 is intended to illustrate a hardware device on which components illustrated or described relative to the examples of the figures and any other components described in this specification can be implemented.

The computing system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 400. In some implementation, the computing system 400 can be an embedded computer system, a system-on-chip (SOC), a single-board computer system or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A method for utilizing secure connections in a wireless telecommunication network, the method comprising:
receiving, from a mobile device utilizing the wireless telecommunication network, an indication of a secure connection between the mobile device and an endpoint of the wireless telecommunication network,
wherein the secure connection is associated with a security policy and a routing policy;
determining that a first set of parameters of the security policy is misaligned with a second set of parameters of the routing policy,
wherein the first set of parameters being misaligned with the second set of parameters comprises at least one of: (a) the first set of parameters specifying an Internet Protocol (IP) address range and the second set of parameters specifying that an IP address of the endpoint is outside the specified IP address range, (b) the first set of parameters specifying a first type of security policy for the secure connection and the second set of parameters specifying that the endpoint uses a second type of security policy different from the first type of security policy, or (c) the first set of parameters specifying a reuse of an existing secure connection and the second set of parameters specifying an establishment of a new secure connection;
modifying, based on the determining, (a) at least one of the first set of parameters to align parameters of the security policy with parameters of the routing policy or (b) at least one of the second set of parameters to align the parameters of the routing policy with the parameters of the security policy; and
transmitting, to the mobile device, the modified at least one of the first set of parameters or the modified at least one of the second set of parameters.

2. The method of claim 1, wherein the wireless telecommunication network is a Fifth Generation (5G) network, and wherein the security policy corresponds to an IPsec security context and the routing policy corresponds to a User Equipment Route Selection Policy (URSP).

3. The method of claim 2, wherein the first set of parameters comprises one or more of a local IP address, a remote IP address, a transport protocol identifier of a transport protocol for the secure connection, a local port corresponding to the local IP address and the transport protocol, a remote port corresponding to the remote IP address and the transport protocol, an Internet Control Message Protocol (ICMP) message type or code, or a mobility header type.

4. The method of claim 2, wherein the second set of parameters comprises one or more of an application identifier, an IP 3-tuple comprising an IP address, a port, and a transport protocol, a non-IP descriptor, a Data Network Name (DNN), a connection capability, or a domain descriptor.

5. The method of claim 1, wherein the indication is received by a Policy Control Function (PCF) that is communicatively coupled to the mobile device.

6. The method of claim 1, wherein the first set of parameters associated with the security policy is configured by a user of the mobile device.

7. The method of claim 1, wherein each of a number of secure connections being used by the mobile device is associated with the first set of parameters, and wherein the method further comprises:
determining that the number of secure connections is less than a maximum number of secure connections specified in the second set of parameters.

8. The method of claim 1, wherein the security policy operates at a first level of granularity of a communication resource, and wherein the routing policy operates at a second level of granularity that is different from the first level of granularity.

9. The method of claim 8, wherein a granularity of the communication resource comprises at least one of an address, a port value, a range of addresses, a range of port values, a single Data Network Name (DNN), multiple DNNs, a domain or a subdomain of one or more Fully Qualified Domain Networks (FQDNs), or a characteristic of a Quality-of-Service (QoS) flow.

10. At least one non-transitory computer-readable storage medium storing instructions to utilize secure connections in a wireless telecommunication network, the instructions, when executed by at least one data processor of a system, causing the system to:
   receive, from a mobile device utilizing the wireless telecommunication network, an indication of a secure connection between the mobile device and an endpoint of the wireless telecommunication network,
      wherein the secure connection is associated with a security policy and a routing policy,
      wherein the security policy comprises a first set of parameters and operates at a first level of granularity, and
      wherein the routing policy comprises a second set of parameters and operates at a second level of granularity that is different from the first level of granularity;
   determine a mapping between the first set of parameters and the second set of parameters that aligns the first level of granularity with the second level of granularity; and
   transmit, to the mobile device, the mapping to enable the mobile device to utilize the secure connection.

11. The at least one non-transitory computer-readable storage medium of claim 10, wherein the first level of granularity corresponds to at least one of a first duration a schedulable timeslot, a first size of a network slice, or a first characteristic of a Quality-of-Service (QoS) flow.

12. The at least one non-transitory computer-readable storage medium of claim 10, wherein the wireless telecommunication network is a Fifth Generation (5G) network, wherein the security policy corresponds to an IPsec security context, and wherein the first set of parameters are stored in one or more of a Security Policy Database (SPD), a Security Associations Database (SAD), or a Peer Authentication Database (PAD).

13. The at least one non-transitory computer-readable storage medium of claim 12, wherein a value of at least one of the second set of parameters is equal to a value of a corresponding parameter in the first set of parameters that is stored in the SPD, the SAD, or the PAD.

14. The at least one non-transitory computer-readable storage medium of claim 10, wherein the mapping comprises an indication of whether to reuse an existing secure tunnel or initiate a new secure tunnel.

15. The at least one non-transitory computer-readable storage medium of claim 10, wherein the mapping comprises a correspondence between a fully qualified domain name (FQDN) of the endpoint and a range of Internet Protocol (IP) addresses that can be used by the mobile device.

16. The at least one non-transitory computer-readable storage medium of claim 10, wherein the mapping comprises a correspondence between one or more of the first set of parameters and a service flow or a quality-of-service (QoS) flow.

17. At least one non-transitory computer-readable storage medium storing instructions to utilize secure connections in a wireless telecommunication network, the instructions, when executed by at least one data processor of a system, causing the system to:
   receive, from a user equipment utilizing the wireless telecommunication network, an indication of a secure connection between the user equipment and an endpoint of the wireless telecommunication network,
      wherein the secure connection is associated with a security policy comprising a first set of parameters and a routing policy comprising a second set of parameters, and
      wherein the secure connection comprises a plurality of characteristics;
   identify a first parameter of the first set of parameters and a second parameter of the second set of parameters that correspond to at least one characteristic of the plurality of characteristics;
   configure the at least one characteristic subsequent to modifying (a) the first parameter to align with the second parameter or (b) the second parameter to align with the first parameter;
   transmit, to the user equipment, the modified first parameter or the modified second parameter,
      wherein the user equipment, upon reception of the modified first parameter or the modified second parameter, is configured to utilize the secure connection with the configured at least one characteristic.

18. The at least one non-transitory computer-readable storage medium of claim 17, wherein the at least one characteristic comprises a source address, a destination address, a range of addresses, one or more connection capabilities, a destination domain specified by a Fully Qualified Domain Name (FQDN), a quality-of-service (QoS) metric, or a number of secure tunnels supported by the secure connection.

19. The at least one non-transitory computer-readable storage medium of claim 18, wherein the first set of parameters comprises one or more of a local IP address, a remote IP address, a transport protocol identifier of a transport protocol for the secure connection, a local port corresponding to the local IP address and the transport protocol, a remote port corresponding to the remote IP address and the transport protocol, an Internet Control Message Protocol (ICMP) message type or code, or a mobility header type.

20. The at least one non-transitory computer-readable storage medium of claim 18, wherein the second set of parameters comprises one or more of an application identifier, an IP 3-tuple comprising an IP address, a port, and a transport protocol, a non-IP descriptor, a Data Network Name (DNN), a connection capability, or a domain descriptor.

* * * * *